(12) United States Patent
Gaal et al.

(10) Patent No.: US 9,172,513 B2
(45) Date of Patent: Oct. 27, 2015

(54) RESOURCE ASSIGNMENTS FOR UPLINK CONTROL CHANNEL

(75) Inventors: Peter Gaal, San Diego, CA (US); Wanshi Chen, San Diego, CA (US); Xiliang Luo, Cardiff, CA (US); Juan Montojo, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 420 days.

(21) Appl. No.: 13/269,480

(22) Filed: Oct. 7, 2011

(65) Prior Publication Data

US 2012/0263124 A1 Oct. 18, 2012

Related U.S. Application Data

(60) Provisional application No. 61/391,991, filed on Oct. 11, 2010, provisional application No. 61/411,854, filed on Nov. 9, 2010.

(51) Int. Cl.
*H04J 11/00* (2006.01)
*H04L 5/00* (2006.01)

(52) U.S. Cl.
CPC ............ *H04L 5/0016* (2013.01); *H04L 5/0053* (2013.01)

(58) Field of Classification Search
CPC .............. H04W 72/04; H04W 72/042; H04W 72/0466; H04W 28/26; H04W 48/12; H04L 5/0053; H04L 5/0048; H04L 5/0016; H04L 5/0023; H04L 5/0007; H04L 27/2613; H04Q 11/0062; H04Q 2011/0081; H04Q 2011/0092; H04Q 2011/0079; H04J 13/004; H04J 13/12; H04J 14/0283; H04J 14/0295; H04J 14/0286

USPC .......................... 370/203, 208–210; 375/260
See application file for complete search history.

(56) References Cited

U.S. PATENT DOCUMENTS

| | | | |
|---|---|---|---|
| 6,285,663 | B1 | 9/2001 | Esmailzadeh |
| 7,047,016 | B2 | 5/2006 | Walton et al. |
| 7,308,063 | B2 | 12/2007 | Priotti |
| 8,498,215 | B2 | 7/2013 | Walton et al. |
| 8,503,375 | B2 | 8/2013 | Malladi et al. |
| 2003/0053413 | A1 | 3/2003 | Sawahashi et al. |
| 2006/0256761 | A1 | 11/2006 | Meylan et al. |

(Continued)

FOREIGN PATENT DOCUMENTS

| CN | 101001136 A | 7/2007 |
|---|---|---|
| CN | 101087169 A | 12/2007 |

(Continued)

OTHER PUBLICATIONS

Partial International Search Report—PCT/US2011/055636—ISA/EPO—Feb. 6, 2012.

(Continued)

*Primary Examiner* — Thai Hoang
(74) *Attorney, Agent, or Firm* — Seyfarth Shaw LLP

(57) ABSTRACT

A wireless communication method includes allocating physical uplink control channel (PUCCH) data in first slot to a first orthogonal cover code (OCC). The method also includes allocating PUCCH data in a second slot of the same subframe to a different orthogonal cover code (OCC). Another method includes mapping PUCCH resources to physical resource blocks based on a user equipment (UE) specific signaling parameter (e.g., a resource index) and a number of symbols in a slot of a subframe.

16 Claims, 8 Drawing Sheets

(56) References Cited

U.S. PATENT DOCUMENTS

| | | |
|---|---|---|
| 2006/0274710 A1 | 12/2006 | Lim et al. |
| 2006/0274839 A1 | 12/2006 | Fukuta et al. |
| 2007/0097887 A1 | 5/2007 | Kim et al. |
| 2007/0165588 A1 | 7/2007 | McCoy |
| 2007/0183386 A1 | 8/2007 | Muharemovic et al. |
| 2008/0081651 A1 | 4/2008 | Kuroda et al. |
| 2009/0003274 A1 | 1/2009 | Kwak et al. |
| 2009/0022135 A1 | 1/2009 | Papasakellariou et al. |
| 2009/0046646 A1 | 2/2009 | Cho et al. |
| 2009/0129259 A1 | 5/2009 | Malladi et al. |
| 2009/0231993 A1 | 9/2009 | Zhang et al. |
| 2009/0262856 A1 | 10/2009 | Onggosanusi et al. |
| 2009/0268685 A1 | 10/2009 | Chen et al. |
| 2010/0173641 A1 | 7/2010 | Kim et al. |
| 2011/0142075 A1* | 6/2011 | Che et al. .............. 370/476 |
| 2011/0158191 A1 | 6/2011 | Zhang et al. |
| 2011/0164489 A1* | 7/2011 | Papasakellariou et al. ... 370/203 |
| 2011/0280203 A1 | 11/2011 | Han et al. |
| 2012/0014320 A1* | 1/2012 | Nam et al. .............. 370/328 |
| 2012/0106595 A1* | 5/2012 | Bhattad et al. .......... 375/146 |
| 2012/0300728 A1* | 11/2012 | Lee et al. ............... 370/329 |
| 2013/0315051 A1 | 11/2013 | Malladi et al. |

FOREIGN PATENT DOCUMENTS

| | | |
|---|---|---|
| CN | 101127747 A | 2/2008 |
| CN | 101743704 A | 6/2010 |
| EP | 1585246 A2 | 10/2005 |
| EP | 1750387 A1 | 2/2007 |
| EP | 1764967 A2 | 3/2007 |
| EP | 1816666 A1 | 8/2007 |
| JP | 2003143654 A | 5/2003 |
| JP | 2007043715 A | 2/2007 |
| JP | 2007053815 A | 3/2007 |
| JP | 2010536230 A | 11/2010 |
| JP | 2012509002 A | 4/2012 |
| KR | 20060053671 A | 5/2006 |
| KR | 20060120737 A | 11/2006 |
| KR | 20070011171 A | 1/2007 |
| RU | 2221343 C2 | 1/2004 |
| RU | 2288538 C2 | 11/2006 |
| RU | 2303856 C2 | 7/2007 |
| TW | 200707956 | 2/2007 |
| WO | WO2005015801 A2 | 2/2005 |
| WO | WO-2006016457 A1 | 2/2006 |
| WO | WO-2006055646 A2 | 5/2006 |
| WO | WO-2006086359 A2 | 8/2006 |
| WO | WO2007133411 | 11/2007 |
| WO | WO2008153369 A1 | 12/2008 |
| WO | WO2009022833 A2 | 2/2009 |
| WO | WO2009156441 A2 | 12/2009 |
| WO | WO-2010056078 A2 | 5/2010 |

OTHER PUBLICATIONS

Nakao S et al: "Performance Enhancement of E-UTRA uplink Control change in fast fading Environment", 2009 IEEE 69th Vehicular Technology conference.Apr. 26-29, 2009, Barcelona, Spain, I EEE, Piscataway, NJ, USA, Apr. 26, 2009 p. 1-5, XP031474732, ISBN: 978-1-4244-2517-4 the wholes document.
Motorola, R1-103931 "OCC and CS Configuration for Uplink DM-RS," 3GPP TSG RAN WG1 #61bis, Jun. 28-Jul. 3, 2010, Dresden, Germany, 5 pages.
Qualcomm Incorporated, 3GPP Draft: R1-105555 "Further details of PUCCH format 3," 3GPP TSG-RAN WG1 #62bis, Oct. 11-15, 2010, Xi'an, China, 10 pages.
Sharp, R1-111145 "Clarification on OCC Application for UL DMRS," 3GPP TSG RAN WG1 #64, Feb. 21-25, 2011, Taipei, Taiwan, 5 pages.
Agilent Technologies: "Clarification of BLER for CQI under fading" 3GPP Draft; R4-051043, 3rd Generation Partnership Project (3GPP), Mobile Competence Centre ; 650, Route Des Lucioles ; F-06921 Sophia-Antipolis Cedex ; France, no. London, UK; Sep. 2, 2005, XP050174611 p. 3, lines 3-5.

Catt, et al., "Clarifications of the dynamic beam-forming/pre-coding method in TDD mode and text proposal" 3GPP Draft; R1-060934, 3rd Generation Partnership Project (3GPP), Mobile Competence Centre ; 650, Route Des Lucioles ; F-06921 Sophia-Antipolis Cedex ; France, vol. RAN WG1, no. Athens, Greece; Mar. 27, 2006, Mar. 21, 2006, XP050101837 p. 5, penultimate paragraph.
Cho M., et al., "A Novel Time Spreading Method for Down-link OFDMCode Division Multiplexing Systems", IEEE Vehicular Technology Conference, VTC2004—Fall, vol. 3, Sep. 26, 2004, pp. 1845-1848, XP010786956.
Galda D., et al., "A Low Complexity Transmission Structure for OFDM-FDMA Uplink Systems", IEEE Vehicular Technology Conference, VTC2OO2—Spring, vol. 4, May 6, 2002, pp. 1737-1741, XP010622113.
Motorola: "Multiplexing of UL L1/L2 control signals in the absence of data" 3GPP Draft; R1-072185 UL_CCH_NODATA, 3rd Generation Partnership Project (3GPP), Mobile Competence Centre ; 650, Route Des Lucioles ; F-06921 Sophia-Antipolis Cedex; France, vol. RAN WG1, no. Kobe, Japan; May 7, 2007, May 2, 2007, XP050105925 sections 2 and 3.
Nokia, et al., "Data-non-associated control signal transmission without UL data" 3GPP Draft; R1-071676, 3rd Generation Partnership Project (3GPP), Mobile Competence Centre ; 650, Route Des Lucioles ; F-06921 Sophia-Antipolis Cedex ; France, vol. RAN WG1, no. St. Julian; Mar. 26, 2007, Mar. 21, 2007, XP050105599 section 3 and 4.
Nokia Siemens Networks, Nokia,Multiplexing capability of CQIs and ACK/NACKs form different UEs[online],3GPP TSG-RAN WG1 Meeting 49 R1-072315, <URL:http://www.3gpp.org/ftp/tsg_ran/WG1_RL1/TSGR1_49/Docs/R1-072315.zip>, May 2007.
"Non-codebook based Precoding in E-UTRA TDD" 3GPP Draft; R1-070201 Non-Codebook Based Precoding in E-UTRA TDD, 3rd Generation Partnership Project (3GPP), Mobile Competence Centre ; 650, Route Des Lucioles ; F-06921 Sophia-Antipolis Cedex ; France, vol. RAN WG1, no. Sorrento, Italy; Jan. 15, 2007, Jan. 9, 2007, XP050104244 sections 2-4.
NTT DoCoMo, et al.: "Coding Scheme of L1/L2 Control Channel for E-UTRA Downlink" 3GPP TSG RAN WG1 LTE Ad Hoc, Cannes, France, Jun. 27-30, 2006, R1-061672, XP002436686.
Philips: "Reduction of HS-DPCCH power requirements" 36PP Draft; Rl-02-1085, 3rd Generation Partnership Project (3GPP), Mobile Competence Centre ; 650, Route Des Lucioles ; F-06921 Sophia-Antipolis Cedex ; France, no. Seattle, USA; Aug. 19, 2002, Aug. 15, 2002, XP050096724 section 2, lines 1-2.
Priyanto B. E. et al., "Initial Performance Evaluation of DFT-Spread OFDM Based SC-FDMA for UTRA LTE Uplink", IEEE VTC 2007 Spring, Apr. 22.
Rani: "LS on status of Rel-7 FDD MIMO" 3GPP Draft; Rl-063009, 3rd Generation Partnership Project (3GPP), Mobile Competence Centre ; 650, Route Des Lucioles ; F-06921 Sophia-Antipolis Cedex ; France, vol. RAN WG1, no. Seoul, Korea; Oct. 9, 2006, Oct. 13, 2006, XP050103465 p. 2, paragraph 2.
Taiwan Search Report—TW097130810—TIPO—Jun. 15, 2012.
Texas Instruments: "Transmission of Downlink CQI in E-UTRA Uplink" 3GPP Draft; R1-072212-CQI, 3rd Generation Partnership Project (3GPP), Mobile Competence Centre ; 650, Route Des Lucioles ; F-06921 Sophia-Antipolis Cedex ; France, vol. RAN WG1, no. Kobe, Japan; May 7, 2007, May 1, 2007, XP050105948 section 2.
Huawei: "Consideration on SRI transmission on PUCCH", 3GPP Draft; R1-081783, 3rd Generation Partnership Project (3GPP), Mobile Competence Centre ; 650, Route Des Lucioles ; F-06921 Sophia-Antipolis Cedex ; France, vol . RAN WG1, no. Kansas City, USA; May 14, 2008, XP050110163, [retrieved on May 14, 2008].
International Search Report and Written Opinion—PCT/US2011/055636—ISA/EPO—Mar. 26, 2012.
Nokia Siemens Networks et al: "Remaining details related to PUCCH Format 3", 3GPP Draft; R1-105519, 3rd Generation Partnership Project (3GPP), Mobile Competence Centre ; 650, Route Des Lucioles ; F-06921 Sophia-Antipolis Cedex ; France, vol. RAN WG1, no. Xi 'an; Oct. 11, 2010, Oct. 5, 2010, XP050450632, [retrieved on Oct. 5, 2010].

(56) References Cited

OTHER PUBLICATIONS

Huawei: "Slot-based Cyclic Shift and Orthogonal Cover Re-mapping for PUCCH", 3GPP TSG-RAN WG1 Meeting #52 (R1-081027), 3 pages, Sorrento, Italy, Feb. 11-15, 2008.
IP Wireless, "Precoding performance comparison for E-UTRA TDD [online]", 3GPP TSG-RAN WG1#48, R1-070977, pages 6, <URL: http://www.3gpp.org/ftp/tsg_ran/WG1_RL1/TSGR1_48/Docs/R1-070977.zip>, Feb. 12, 2007.
Nokia: "CDM based Control Signal multiplexing w/ and w/o additional RS", 3GPP TSG-RAN WG1#47bis, R1-070395, Jan. 15, 2007, 5 Pages, URL: http://www.3gpp.org/ftp/tsg_ran/WG1_RL1/TSGR1_47bis/Docs/R1-070395.zip.
Nokia: "Data-non-associated control signal transmission without UL data", 3GPP TSG-RAN WG1#48, R1-070998, Feb. 12, 2007, 6 Pages, URL: http://www.3gpp.org/ftp/tsg_ran/WG1_RL1/TSGR1_48/Docs/R1-070998.zip.
Qualcomm Europe, "Details on UL Antenna Switching [online]", 3GPP TSG-RAN WG1#50 R1-073272, pp. 1-5, <URL:http://www.3gpp.org/ftp/tsg_ran/WG1_RL1/TSGR1_50/Docs/R1-073272.zip>, Aug. 20, 2007.
Samsung, "Discussion on Transmit Diversity for DFT-S-OFDM", 3GPP TSG-RAN WG1#62 R1-104617, Aug. 23, 2010, pp. 1-11.
Samsung: "Selection of Orthogonal Cover and Cyclic Shift for High Speed UL ACK", 3GPP TSG RAN WG1 Meeting #50 (R1-073564), 5 pages, Athens, Greece, Aug. 20-24, 2007.
Samsung: "Slot-level UL ACK/NACK Cyclic Shift/Orthogonal Cover Remapping", 3GPP TSG RAN WG1 Meeting #52 (R1-080680), 6 pages, Sorrento, Italy, Feb. 11-15, 2008.
Taiwan Search Report—TW100136848—TIPO—Sep. 26, 2013.
3GPP TS 36.211, "3rd Generation Partnership Project; Technical Specification Group Radio Access Network; Evolved Universal Terrestrial Radio Access (E-UTRA) Physical Channels and Modulation (Release 9)", (Mar. 31, 2010), pp. 1-85, V9.1.0.
NTT DOCOMO, et al., "Coding Scheme of L1/L2 Control Channel for E-UTRA Downlink" 3GPP TSG RAN WG1 Meeting #47, Nov. 6-10, 2006, R1-063322.

\* cited by examiner

RESOURCE ASSIGNMENTS FOR UPLINK CONTROL CHANNEL

CROSS REFERENCE TO RELATED APPLICATIONS

The present application claims the benefit of U.S. provisional patent application No. 61/391,991 to GAAL et al., filed on Oct. 11, 2010, and U.S. provisional patent application No. 61/411,854 to GAAL et al., filed on Nov. 9, 2010, the disclosures of which are expressly incorporated by reference herein in their entireties.

BACKGROUND

I. Field

The present disclosure relates generally to communications, and more specifically to techniques for allocating transmission resources in a (long term evolution (LTE) wireless communication system

II. Background

Wireless communication networks are widely deployed to provide various communication services such as voice, video, packet data, messaging, broadcast, etc. These wireless networks may be multiple-access networks capable of supporting multiple users by sharing the available network resources. A wireless communication network may include a number of base stations that can support communication for a number of user equipments (UEs). A UE may communicate with a base station via the downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance the UMTS technologies not only to meet the growing demand for mobile broadband access, but to advance and enhance the user experience with mobile communications.

SUMMARY

These and other problems are solved by the disclosed techniques of allocating resources, such as orthogonal cover codes (OCCs) to physical uplink control channel (PUCCH) format 3 data, and PUCCH format 3 resources to physical resource blocks (PRBs).

In one aspect, a method of wireless communication is disclosed. The method includes transmitting physical uplink control channel (PUCCH) data in a first slot of a subframe with a first orthogonal cover code (OCC). The method also includes transmitting physical uplink control channel (PUCCH) data in a second slot of the subframe with a second orthogonal cover code that differs from the first OCC.

In another aspect, a method of wireless communication discloses receiving physical uplink control channel (PUCCH) data. The method also discloses despreading the PUCCH data in a first slot of a subframe having a first orthogonal cover code (OCC). Also discloses is despreading the PUCCH data in a second slot of the subframe having a second orthogonal cover code that differs from the first OCC.

Another aspect discloses a method of wireless communication that includes determining a user equipment (UE) specific signaling parameter. Also included is transmitting in accordance with physical uplink control channel (PUCCH) resources mapped to physical resource blocks (PRBs) based on the user equipment (UE) specific signaling parameter and a number of symbols in a slot of a subframe.

In another aspect, a method of wireless communication discloses determining a user equipment (UE) specific signaling parameter. Also included is receiving in accordance with physical uplink control channel (PUCCH) resources mapped to physical resource blocks (PRBs) based on the user equipment (UE) specific signaling parameter and a number of symbols in a slot of a subframe.

Another aspect discloses wireless communication having a memory and at least one processor coupled to the memory. The processor(s) is configured to transmit physical uplink control channel (PUCCH) data in a first slot of a subframe with a first orthogonal cover code (OCC). The processor is also configured to transmit physical uplink control channel (PUCCH) data in a second slot of the subframe with a second orthogonal cover code that differs from the first OCC.

In another aspect, a wireless communication having a memory and at least one processor coupled to the memory is disclosed. The processor(s) is configured to receive physical uplink control channel (PUCCH) data and to despread the PUCCH data in a first slot of a subframe having a first orthogonal cover code (OCC). The processor(s) is also configured to despread the PUCCH data in a second slot of the subframe having a second orthogonal cover code that differs from the first OCC.

Another aspect discloses wireless communication having a memory and at least one processor coupled to the memory. The processor(s) is configured to determine a user equipment (UE) specific signaling parameter. the processor(s) is also configured to transmit in accordance with physical uplink control channel (PUCCH) resources mapped to physical resource blocks (PRBs) based on the user equipment (UE) specific signaling parameter and a number of symbols in a slot of a subframe.

In another aspect, a wireless communication having a memory and at least one processor coupled to the memory is disclosed. The processor(s) is configured to determining a user equipment (UE) specific signaling parameter. The processor(s) is also configured to receive in accordance with physical uplink control channel (PUCCH) resources mapped to physical resource blocks (PRBs) based on a user equipment (UE) specific signaling parameter and a number of symbols in a slot of a subframe.

In another aspect, an apparatus for wireless communication is disclosed an includes means for transmitting physical uplink control channel (PUCCH) data in a first slot of a subframe with a first orthogonal cover code (OCC). Also included is means for transmitting physical uplink control channel (PUCCH) data in a second slot of the subframe with a second orthogonal cover code that differs from the first OCC.

Another aspect discloses an apparatus including means for receiving physical uplink control channel (PUCCH) data. Also included is means for despreading the PUCCH data in a first slot of a subframe having a first orthogonal cover code (OCC) and means for despreading the PUCCH data in a second slot of the subframe having a second orthogonal cover code that differs from the first OCC.

In another aspect, an apparatus for wireless communication is disclosed an includes means for determining a user equipment (UE) specific signaling parameter. Also included is means for transmitting in accordance with physical uplink control channel (PUCCH) resources mapped to physical resource blocks (PRBs) based on the user equipment (UE) specific signaling parameter and a number of symbols in a slot of a subframe.

Another aspect discloses an apparatus including means for determining a user equipment (UE) specific signaling parameter. Also included is means for receiving in accordance with physical uplink control channel (PUCCH) resources mapped to physical resource blocks (PRBs) based on a user equipment (UE) specific signaling parameter and a number of symbols in a slot of a subframe.

In another aspect, a computer program product for wireless communications in a wireless network is disclosed. The computer readable medium has program code recorded thereon which, when executed by the processor(s), causes the processor(s) to perform operations of transmitting physical uplink control channel (PUCCH) data in a first slot of a subframe with a first orthogonal cover code (OCC). The program code also causes the processor(s) to transmit physical uplink control channel (PUCCH) data in a second slot of the subframe with a second orthogonal cover code that differs from the first OCC.

Another aspect discloses a computer program product for wireless communications in a wireless network. The computer readable medium has program code recorded thereon which, when executed by the processor(s), causes the processor(s) to perform operations of receiving physical uplink control channel (PUCCH) data. The program code also causes the processor(s) to despread the PUCCH data in a first slot of a subframe having a first orthogonal cover code (OCC) and to despread the PUCCH data in a second slot of the subframe having a second orthogonal cover code that differs from the first OCC.

In another aspect, a computer program product for wireless communications in a wireless network is disclosed. The computer readable medium has program code recorded thereon which, when executed by the processor(s), causes the processor(s) to perform operations of determining the user equipment (UE) specific signaling parameter. The program code also causes the processor(s) to transmit in accordance with physical uplink control channel (PUCCH) resources mapped to physical resource blocks (PRBs) based on a user equipment (UE) specific signaling parameter and a number of symbols in a slot of a subframe.

Another aspect discloses a computer program product for wireless communications in a wireless network. The computer readable medium has program code recorded thereon which, when executed by the processor(s), causes the processor(s) to perform operations of determining a user equipment (UE) specific signaling parameter. The program code also causes the processor(s) to receive in accordance with physical uplink control channel (PUCCH) resources mapped to physical resource blocks (PRBs) based on a user equipment (UE) specific signaling parameter and a number of symbols in a slot of a subframe.

In one aspect, a method of wireless communication is disclosed. The method includes determining a user equipment (UE) specific signaling parameter. Also included is transmitting the UE specific signaling parameters to a UE to select a first and a second orthogonal cover code (OCC) used for PUCCH data transmission.

Another aspect discloses wireless communication having a memory and at least one processor coupled to the memory. The processor(s) is configured to determine a user equipment (UE) specific signaling parameter. The processor(s) is also configured to transmit the UE specific signaling parameters to a UE to select a first and a second orthogonal cover code (OCC) used for PUCCH data transmission.

Another aspect discloses an apparatus including means for means for determining a user equipment (UE) specific signaling parameter. Also included is means for transmitting the UE specific signaling parameters to a UE to select a first and a second orthogonal cover code (OCC) used for PUCCH data transmission.

In another aspect, a computer program product for wireless communications in a wireless network is disclosed. The computer readable medium has program code recorded thereon which, when executed by the processor(s), causes the processor(s) to perform operations of program code to determine a user equipment (UE) specific signaling parameter. The program code also causes the processor(s) to transmit the UE specific signaling parameters to a UE to select a first and a second orthogonal cover code (OCC) used for PUCCH data transmission.

This has outlined, rather broadly, the features and technical advantages of the present disclosure in order that the detailed description that follows may be better understood. Additional features and advantages of the disclosure will be described below. It should be appreciated by those skilled in the art that this disclosure may be readily utilized as a basis for modifying or designing other structures for carrying out the same purposes of the present disclosure. It should also be realized by those skilled in the art that such equivalent constructions do not depart from the teachings of the disclosure as set forth in the appended claims. The novel features, which are believed to be characteristic of the disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

The techniques described herein may be used for various wireless communication networks such as Code Division Multiple Access (CDMA), Time Division Multiple Access (TDMA), Frequency Division Multiple Access (FDMA), Orthogonal Frequency Division Multiple Access (OFDMA), Single-Carrier Frequency Division Multiple Access (SC-FDMA) and other networks. The terms "network" and "system" are often used interchangeably. A CDMA network may implement a radio technology, such as Universal Terrestrial Radio Access (UTRA), Telecommunications Industry Association's (TIA's) CDMA2000®, and the like. The UTRA technology includes Wideband CDMA (WCDMA) and other variants of CDMA. The CDMA2000® technology includes the IS-2000, IS-95 and IS-856 standards from the Electronics Industry Alliance (EIA) and TIA. A TDMA network may implement a radio technology, such as Global System for Mobile Communications (GSM). An OFDMA network may implement a radio technology, such as Evolved UTRA (E-UTRA), Ultra Mobile Broadband (UMB), IEEE 802.11 (Wi-Fi), IEEE 802.16 (WiMAX), IEEE 802.20, Flash-OFDMA, and the like. The UTRA and E-UTRA technologies are part of Universal Mobile Telecommunication System (UMTS). 3GPP Long Term Evolution (LTE) and LTE-Advanced (LTE-A) are newer releases of the UMTS that use E-UTRA. UTRA, E-UTRA, UMTS, LTE, LTE-A and GSM are described in documents from an organization called the "3rd Generation Partnership Project" (3GPP). CDMA2000® and UMB are described in documents from an organization called the "3rd Generation Partnership Project 2" (3GPP2). The techniques described herein may be used for the wireless networks and radio access technologies mentioned above, as well as other wireless networks and radio access technologies. For clarity, certain aspects of the techniques are described below for LTE or LTE-A (together referred to in the alternative as "LTE/-A") and use such LTE/-A terminology in much of the description below.

Figure 1:
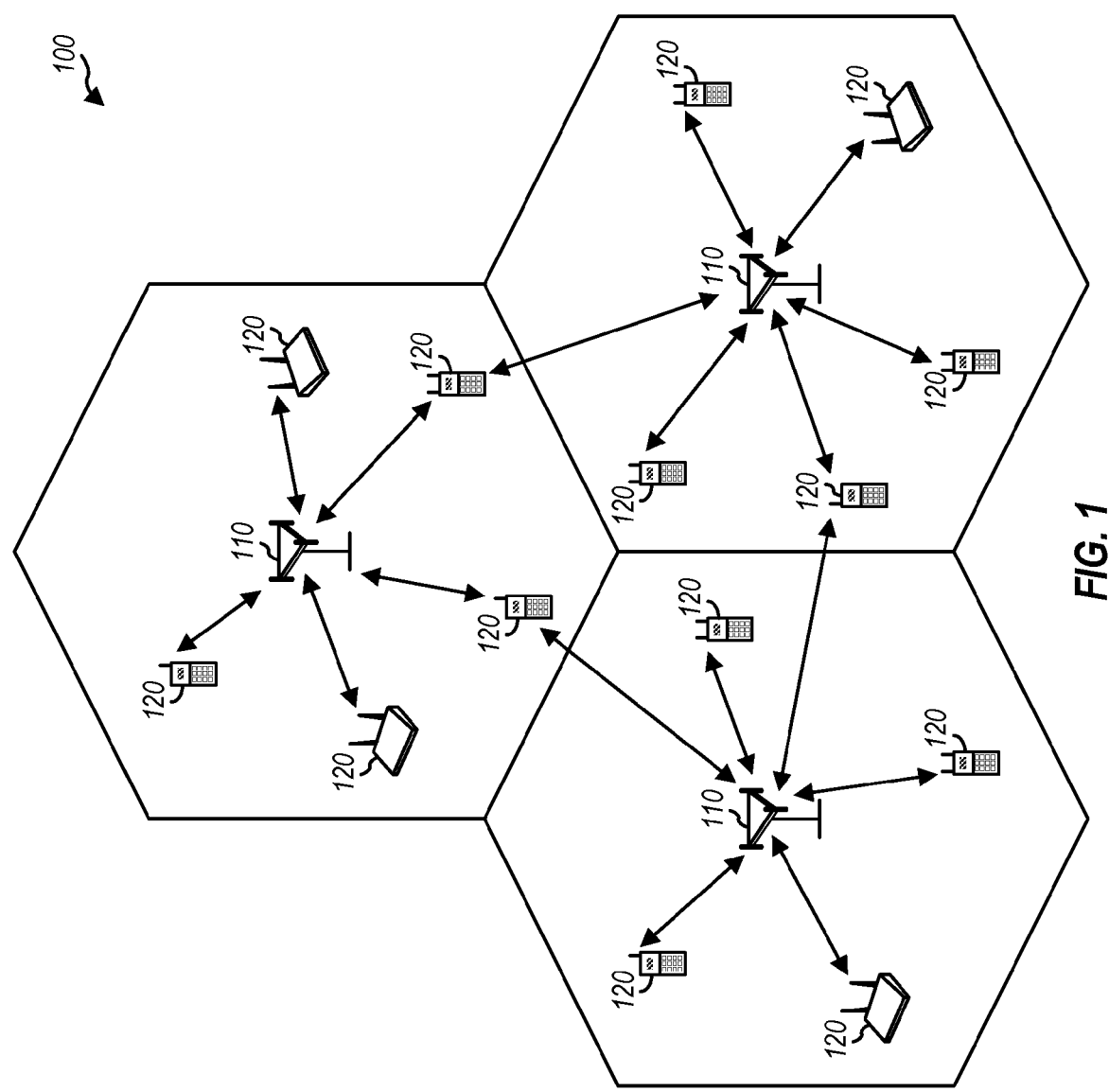
FIG. 1 is a block diagram conceptually illustrating an example of a mobile communication system.

FIG. 1 shows a wireless communication network 100, which may be an LTE/-A network that assigns resources as described below. The wireless network 100 includes a number of evolved node Bs (eNodeBs) 110 and other network entities. An eNodeB may be a station that communicates with the UEs and may also be referred to as a base station, a node B, an access point, and the like. Each eNodeB 110 may provide communication coverage for a particular geographic area. In 3GPP, the term "cell" can refer to this particular geographic coverage area of an eNodeB and/or an eNodeB subsystem serving the coverage area, depending on the context in which the term is used.

An eNodeB may provide communication coverage for a macro cell, a pico cell, a femto cell, and/or other types of cell. A macro cell generally covers a relatively large geographic area (e.g., several kilometers in radius) and may allow unrestricted access by UEs with service subscriptions with the network provider. A pico cell would generally cover a relatively smaller geographic area and may allow unrestricted access by UEs with service subscriptions with the network provider. A femto cell would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). An eNodeB for a macro cell may be referred to as a macro eNodeB. An eNodeB for a pico cell may be referred to as a pico eNodeB. And, an eNodeB for a femto cell may be referred to as a femto eNodeB or a home eNodeB. In the example shown in FIG. 1, the eNodeBs 110a, 110b and 110c are macro eNodeBs for the macro cells 102a, 102b and 102c, respectively. The eNodeB 110x is a pico eNodeB for a pico cell 102x. And, the eNodeBs 110y and 110z are femto eNodeBs for the femto cells 102y and 102z, respectively. An eNodeB may support one or multiple (e.g., two, three, four, and the like) cells.

The wireless network 100 may also include relay stations. A relay station is a station that receives a transmission of data and/or other information from an upstream station (e.g., an eNodeB, UE, etc.) and sends a transmission of the data and/or other information to a downstream station (e.g., a UE or an eNodeB). A relay station may also be a UE that relays transmissions for other UEs. In the example shown in FIG. 1, a relay station 110r may communicate with the eNodeB 110a and a UE 120r in order to facilitate communication between the eNodeB 110a and the UE 120r. A relay station may also be referred to as a relay eNodeB, a relay, etc.

The wireless network 100 may be a heterogeneous network that includes eNodeBs of different types, e.g., macro eNodeBs, pico eNodeBs, femto eNodeBs, relays, etc. These different types of eNodeBs may have different transmit power levels, different coverage areas, and different impact on interference in the wireless network 100. For example, macro eNodeBs may have a high transmit power level (e.g., 20 Watts) whereas pico eNodeBs, femto eNodeBs and relays may have a lower transmit power level (e.g., 1 Watt).

The wireless network 100 may support synchronous or asynchronous operation. For synchronous operation, the eNodeBs may have similar frame timing, and transmissions from different eNodeBs may be approximately aligned in time. For asynchronous operation, the eNodeBs may have different frame timing, and transmissions from different eNodeBs may not be aligned in time. The techniques described herein may be used for either synchronous or asynchronous operations.

In one aspect, the wireless network 100 may support Frequency Division Duplex (FDD) or Time Division Duplex (TDD) modes of operation. The techniques described herein may be used for FDD or TDD mode of operation.

A network controller 130 may couple to a set of eNodeBs 110 and provide coordination and control for these eNodeBs 110. The network controller 130 may communicate with the eNodeBs 110 via a backhaul. The eNodeBs 110 may also communicate with one another, e.g., directly or indirectly via a wireless backhaul or a wireline backhaul.

The UEs 120 (e.g., UE 120x, UE 120y, etc.) are dispersed throughout the wireless network 100, and each UE may be stationary or mobile. A UE may also be referred to as a terminal, a user terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a netbook, a smart book, or the like. A UE may be able to communicate with macro eNodeBs, pico eNodeBs, femto eNodeBs, relays, and the like. In FIG. 1, a solid line with double arrows indicates desired transmissions between a UE and a serving eNodeB, which is an eNodeB designated to serve the UE on the downlink and/or uplink. A dashed line with double arrows indicates interfering transmissions between a UE and an eNodeB.

LTE/-A utilizes orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, or the like. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a 'resource block') may be 12 subcarriers (or 180 kHz). Consequently, the nominal FFT size may be equal to 128, 256, 512, 1024 or 2048 for a corresponding system bandwidth of 1.25, 2.5, 5, 10 or 20 megahertz (MHz), respectively. The system bandwidth may also be partitioned into sub-bands. For example, a sub-band may cover 1.08 MHz (i.e., 6 resource blocks), and there may be 1, 2, 4, 8 or 16 sub-bands for a corresponding system bandwidth of 1.25, 2.5, 5, 10, 15 or 20 MHz, respectively.

Figure 2:
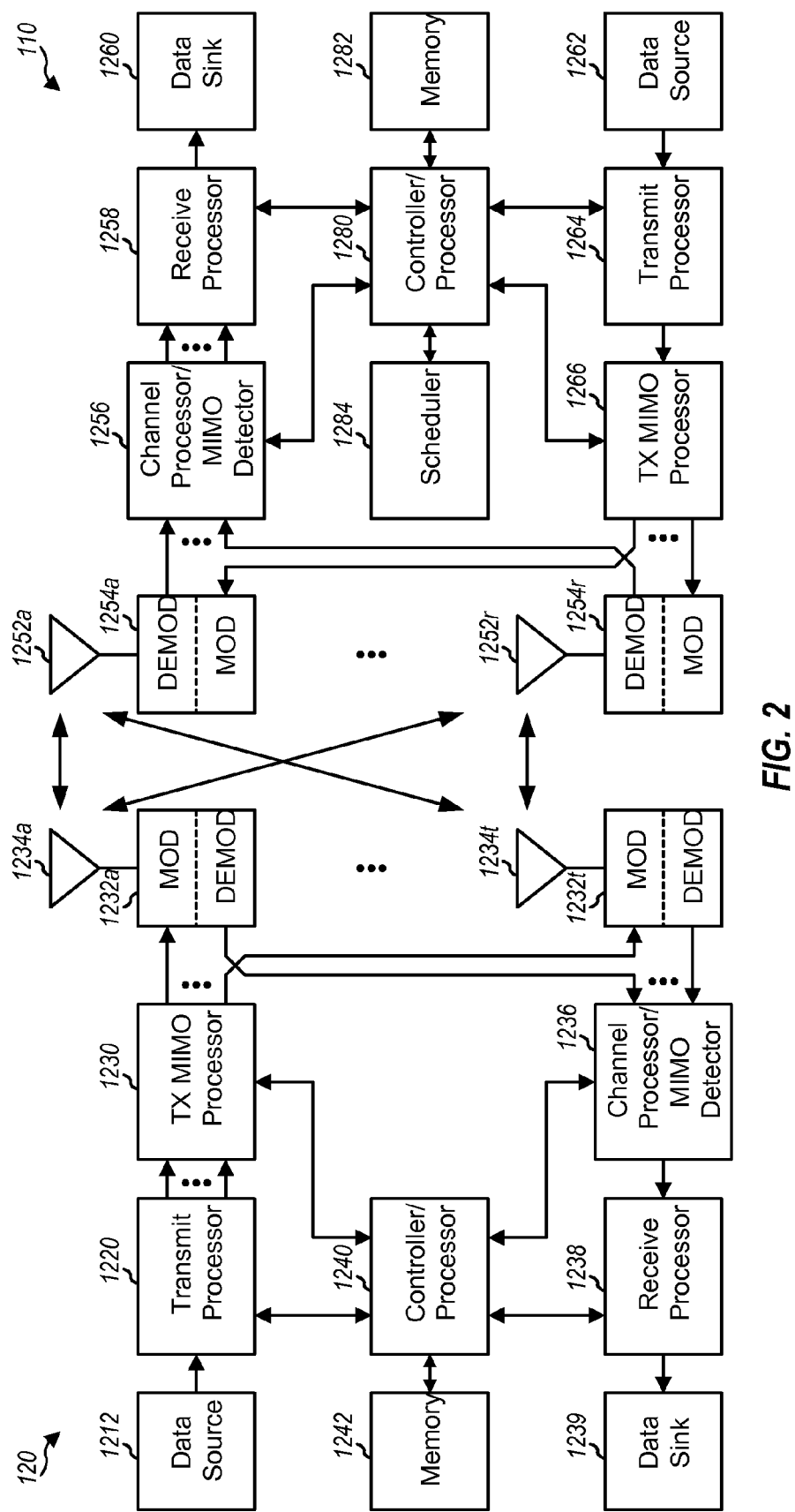
FIG. 2 is a block diagram conceptually illustrating an example of a downlink frame structure in a mobile communication system.

FIG. 2 shows a downlink FDD frame structure used in LTE/-A. The transmission timeline for the downlink may be partitioned into units of radio frames. Each radio frame may have a predetermined duration (e.g., 10 milliseconds (ms)) and may be partitioned into 10 subframes with indices of 0 through 9. Each subframe may include two slots. Each radio frame may thus include 20 slots with indices of 0 through 19. Each slot may include L symbol periods, e.g., 7 symbol periods for a normal cyclic prefix (as shown in FIG. 2) or 6 symbol periods for an extended cyclic prefix. The 2L symbol periods in each subframe may be assigned indices of 0 through 2L-1. The available time frequency resources may be partitioned into resource blocks. Each resource block may cover N subcarriers (e.g., 12 subcarriers) in one slot.

In LTE/-A, an eNodeB may send a primary synchronization signal (PSC or PSS) and a secondary synchronization signal (SSC or SSS) for each cell in the eNodeB. For FDD mode of operation, the primary and secondary synchronization signals may be sent in symbol periods 6 and 5, respectively, in each of subframes 0 and 5 of each radio frame with the normal cyclic prefix, as shown in FIG. 2. The synchronization signals may be used by UEs for cell detection and acquisition. For FDD mode of operation, the eNodeB may send a Physical Broadcast Channel (PBCH) in symbol periods 0 to 3 in slot 1 of subframe 0. The PBCH may carry certain system information.

The eNodeB may send a Physical Control Format Indicator Channel (PCFICH) in the first symbol period of each subframe, as seen in FIG. 2. The PCFICH may convey the number of symbol periods (M) used for control channels, where M may be equal to 1, 2 or 3 and may change from subframe to subframe. M may also be equal to 4 for a small system bandwidth, e.g., with less than 10 resource blocks. In the example shown in FIG. 2, M=3. The eNodeB may send a Physical HARQ Indicator Channel (PHICH) and a Physical Downlink Control Channel (PDCCH) in the first M symbol periods of each subframe. The PDCCH and PHICH are also included in the first three symbol periods in the example shown in FIG. 2. The PHICH may carry information to support hybrid automatic retransmission (HARM). The PDCCH may carry information on uplink and downlink resource allocation for UEs and power control information for uplink channels. The eNodeB may send a Physical Downlink Shared Channel (PDSCH) in the remaining symbol periods of each subframe. The PDSCH may carry data for UEs scheduled for data transmission on the downlink.

The eNodeB may send the PSC, SSC and PBCH in the center 1.08 MHz of the system bandwidth used by the eNodeB. The eNodeB may send the PCFICH and PHICH across the entire system bandwidth in each symbol period in which these channels are sent. The eNodeB may send the PDCCH to groups of UEs in certain portions of the system bandwidth. The eNodeB may send the PDSCH to groups of UEs in specific portions of the system bandwidth. The eNodeB may send the PSC, SSC, PBCH, PCFICH and PHICH in a broadcast manner to all UEs, may send the PDCCH in a unicast manner to specific UEs, and may also send the PDSCH in a unicast manner to specific UEs.

A number of resource elements may be available in each symbol period. Each resource element may cover one subcarrier in one symbol period and may be used to send one modulation symbol, which may be a real or complex value. For symbols that are used for control channels, the resource elements not used for a reference signal in each symbol period may be arranged into resource element groups (REGs). Each REG may include four resource elements in one symbol period. The PCFICH may occupy four REGs, which may be spaced approximately equally across frequency, in symbol period 0. The PHICH may occupy three REGs, which may be spread across frequency, in one or more configurable symbol periods. For example, the three REGs for the PHICH may all belong in symbol period 0 or may be spread in symbol periods 0, 1 and 2. The PDCCH may occupy 9, 18, 36 or 72 REGs, which may be selected from the available REGs, in the first M symbol periods. Only certain combinations of REGs may be allowed for the PDCCH.

A UE may know the specific REGs used for the PHICH and the PCFICH. The UE may search different combinations of REGs for the PDCCH. The number of combinations to search is typically less than the number of allowed combinations for all UEs in the PDCCH. An eNodeB may send the PDCCH to the UE in any of the combinations that the UE will search.

A UE may be within the coverage of multiple eNodeBs. One of these eNodeBs may be selected to serve the UE. The serving eNodeB may be selected based on various criteria such as received power, path loss, signal-to-noise ratio (SNR), etc.

Figure 3:
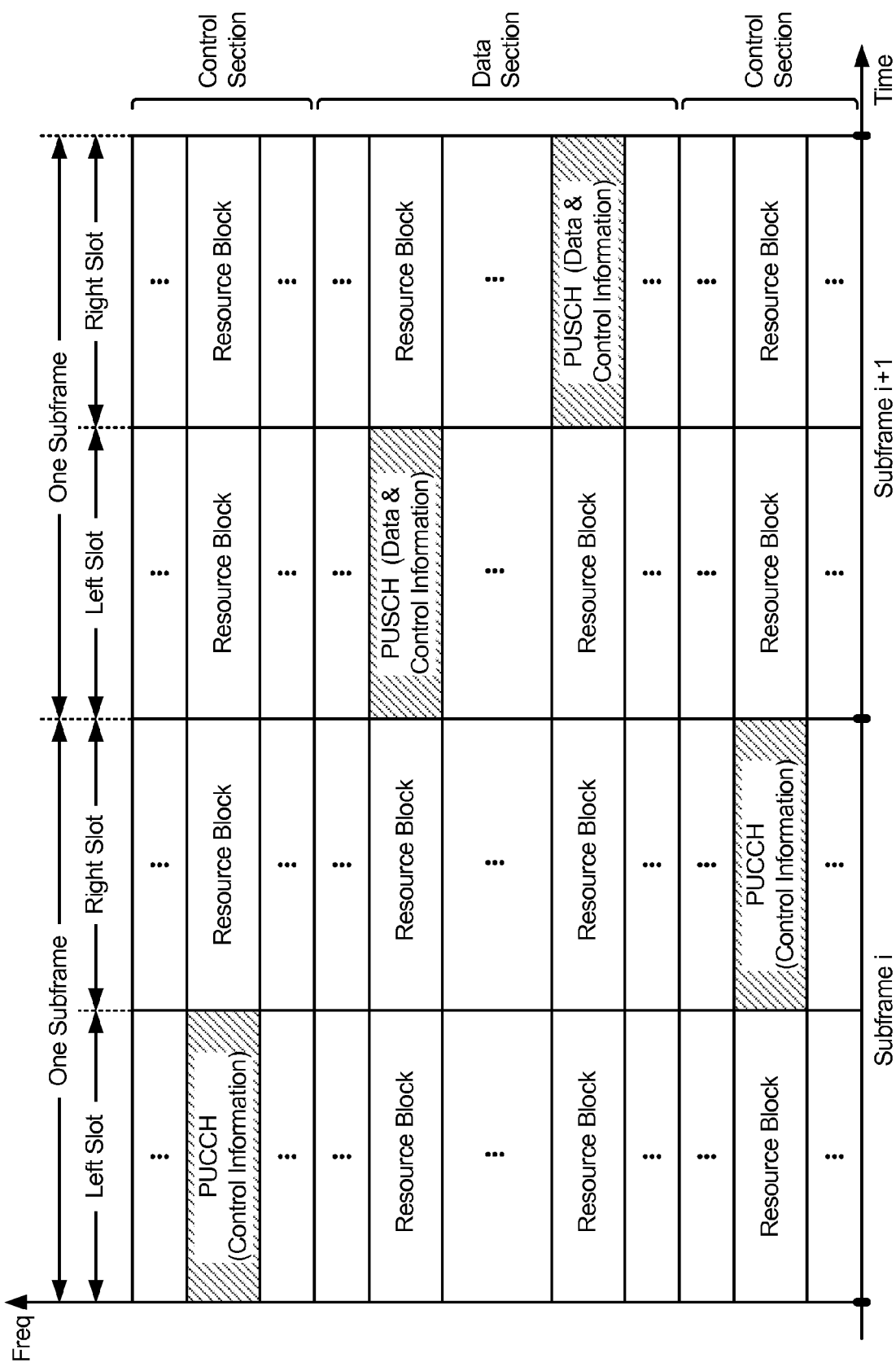
FIG. 3 is a block diagram conceptually illustrating an exemplary frame structure in uplink communications.

FIG. 3 is a block diagram conceptually illustrating an exemplary FDD and TDD (non-special subframe only) subframe structure in uplink LTE/-A communications. The available resource blocks (RBs) for the uplink may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The design in FIG. 3 results in the data section including contiguous subcarriers, which may allow a single UE to be assigned all of the contiguous subcarriers in the data section.

A UE may be assigned resource blocks in the control section to transmit control information to an eNodeB. The UE may also be assigned resource blocks in the data section to transmit data to the eNode B. The UE may transmit control information in a Physical Uplink Control Channel (PUCCH) on the assigned resource blocks in the control section. The UE may transmit only data or both data and control information in a Physical Uplink Shared Channel (PUSCH) on the assigned resource blocks in the data section. An uplink transmission may span both slots of a subframe and may hop across frequency as shown in FIG. 3. According to one aspect, in relaxed single carrier operation, parallel channels may be transmitted on the UL resources. For example, a control and a data channel, parallel control channels, and parallel data channels may be transmitted by a UE.

The PSC (primary synchronization carrier), SSC (secondary synchronization carrier), CRS (common reference signal), PBCH, PUCCH, PUSCH, and other such signals and channels used in LTE/-A are described in 3GPP TS 36.211, entitled "Evolved Universal Terrestrial Radio Access (E-UTRA); Physical Channels and Modulation," which is publicly available.

Figure 4:
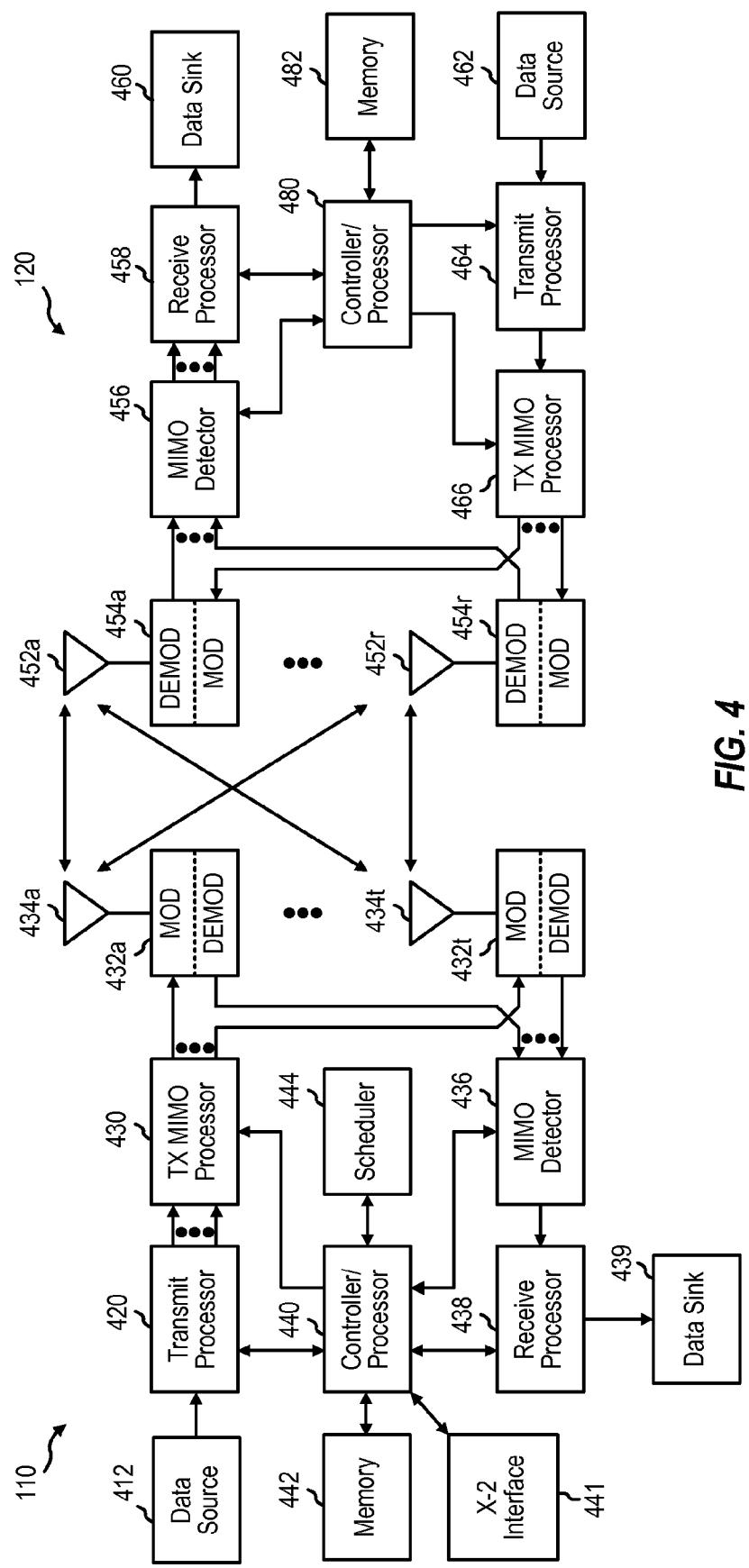
FIG. 4 is a block diagram conceptually illustrating a design of a base station/eNodeB and a UE configured according to an aspect of the present disclosure.

FIG. 4 shows a block diagram of a design of a base station/eNodeB 110 and a UE 120, which may be one of the base stations/eNodeBs and one of the UEs in FIG. 1. For example, the base station 110 may be the macro eNodeB 110c in FIG. 1, and the UE 120 may be the UE 120y. The base station 110 may also be a base station of some other type. The base station 110 may be equipped with antennas 434a through 434t, and the UE 120 may be equipped with antennas 452a through 452r.

At the base station 110, a transmit processor 420 may receive data from a data source 412 and control information from a controller/processor 440. The control information may be for the PBCH, PCFICH, PHICH, PDCCH, etc. The data may be for the PDSCH, etc. The processor 420 may process (e.g., encode and symbol map) the data and control information to obtain data symbols and control symbols, respectively. The processor 420 may also generate reference symbols, e.g., for the PSS, SSS, and cell-specific reference signal. A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) 432a through 432t. Each modulator 432 may process a respective output symbol stream (e.g., for OFDM, etc.) to obtain an output sample stream. Each modulator 432 may further process (e.g., convert to analog, amplify, filter, and upconvert) the output sample stream to obtain a downlink signal. Downlink signals from modulators 432a through 432t may be transmitted via the antennas 434a through 434t, respectively.

At the UE 120, the antennas 452a through 452r may receive the downlink signals from the base station 110 and may provide received signals to the demodulators (DEMODs) 454a through 454r, respectively. Each demodulator 454 may condition (e.g., filter, amplify, downconvert, and digitize) a respective received signal to obtain input samples. Each demodulator 454 may further process the input samples (e.g., for OFDM, etc.) to obtain received symbols. A MIMO detector 456 may obtain received symbols from all the demodulators 454a through 454r, perform MIMO detection on the received symbols if applicable, and provide detected symbols. A receive processor 458 may process (e.g., demodulate, deinterleave, and decode) the detected symbols, provide decoded data for the UE 120 to a data sink 460, and provide decoded control information to a controller/processor 480.

On the uplink, at the UE 120, a transmit processor 464 may receive and process data (e.g., for the PUSCH) from a data source 462 and control information (e.g., for the PUCCH) from the controller/processor 480. The processor 464 may also generate reference symbols for a reference signal. The symbols from the transmit processor 464 may be precoded by a TX MIMO processor 466 if applicable, further processed by the modulators 454a through 454r (e.g., for SC-FDM, etc.), and transmitted to the base station 110. At the base station 110, the uplink signals from the UE 120 may be received by the antennas 434, processed by the demodulators 432, detected by a MIMO detector 436 if applicable, and further processed by a receive processor 438 to obtain decoded data and control information sent by the UE 120. The processor 438 may provide the decoded data to a data sink 439 and the decoded control information to the controller/processor 440. The base station 110 can send messages to other base stations, for example, over an X2 interface 441.

The controllers/processors 440 and 480 may direct the operation at the base station 110 and the UE 120, respectively. The processor 440 and/or other processors and modules at the base station 110 may perform or direct the execution of various processes for the techniques described herein. The processor 480/440 and/or other processors and modules at the UE 120 and eNodeB may also perform or direct the execution of the functional blocks illustrated in use method flow charts shown in FIGS. 6 and 7 and/or other processes for the techniques described herein. The memories 442 and 482 may store data and program codes for the base station 110 and the UE 120, respectively. A scheduler 444 may schedule UEs for data transmission on the downlink and/or uplink.

There exists a present need to define various aspects of allocation of transmission resources in a wireless communication network.

Many details of the new discrete Fourier transform (DFT)-spread SC-FDM PUCCH format have been specified in the current version of LTE-A specification. In a DFT-spread SC-FDM format, the same SC-FDM symbol is repeated in time but each repetition is multiplied with a constant, where the time sequence of those constants forms an orthogonal cover code (OCC). Multiple UEs can be multiplexed in the same physical resource (same time and same frequency) when each of the multiplexed UEs is assigned a different OCC. PUCCH format 3 specified in the current version of the LTE-A specification uses a version of DFT-spread SC-FDM format combined with a per symbol cyclic shift. In this disclosure, certain additional aspects are discussed.

The demodulation reference signal (DM-RS) allocation for PUCCH format 3 has not been defined. In certain designs, a mapping that increases or maximizes the cyclic shift separation may be performed. Furthermore, a remapping may be performed across the DM-RS symbols to move closely spaced cyclic shifts in the first symbol to larger cyclic shift distance and/or reversed positions. In certain designs, first DM-RS symbol assignments may use a first cyclic shift and the second DM-RS symbol assignments may use a second cyclic shift. The second cyclic shift results in transmission resources having a greater distance than the first cyclic shift. The "distance" refers to the numerical difference between the symbol number assignments.

For the normal cyclic prefix (CP), non-shortened PUCCH format 3 (i.e., no sounding reference signal (SRS)), the cyclic shift values may be assigned as shown in Table 1. As can be seen from the entries in Table 1, the first two values in the first symbol (0 and 3) are "closer" to each other than the first two values (0 and 8) in the second symbol.

TABLE 1

Cyclic shift values used in normal (no SRS) PUCCH format 3 in normal CP

| Resource index | Cyclic shift | |
|---|---|---|
| | First DM-RS symbol with $N_{SF,x}^{PUCCH}=5$ | Second DM-RS symbol with $N_{SF,x}^{PUCCH}=5$ |
| 0 | 0 | 0 |
| 1 | 3 | 8 |
| 2 | 5 | 3 |
| 3 | 8 | 10 |
| 4 | 10 | 5 |

For the normal cyclic prefix (CP), shortened PUCCH format 3, the cyclic shift values are given in Table 2.

TABLE 2

Cyclic shift values used in shortened PUCCH format 3 in normal CP

| Resource index | Cyclic shift | |
|---|---|---|
| | First DM-RS symbol with $N_{SF,1}^{PUCCH}=4$ | Second DM-RS symbol with $N_{SF,1}^{PUCCH}=4$ |
| 0 | 0 | 0 |
| 1 | 3 | 9 |
| 2 | 6 | 6 |
| 3 | 9 | 3 |
| 4 | 0 | 0 |

For the extended cyclic prefix, non-shortened PUCCH format 3 (i.e., no SRS), the cyclic shift values are given in Table 3. In certain designs, first slot assignments may use a first cyclic shift and the second slot assignments may use a second cyclic shift. The second cyclic shift results in transmission resources being separated by a greater distance than the first cyclic shift. The "distance" refers to the numerical difference between the slot number assignments. As can be seen from the entries in Table 3, the first two values in the first slot (0 and 3) are "closer" to each other than the first two values (0 and 8) in the second slot.

TABLE 3

Cyclic shift values used in normal (no SRS) PUCCH format 3 in extended CP

| Resource index | Cyclic shift | |
|---|---|---|
| | First slot with $N_{SF,0}^{PUCCH}=5$ | Second slot with $N_{SF,1}^{PUCCH}=5$ |
| 0 | 0 | 0 |
| 1 | 3 | 8 |
| 2 | 5 | 3 |
| 3 | 8 | 10 |
| 4 | 10 | 5 |

For the extended CP, shortened PUCCH format 3, the cyclic shift values are given in Table 4.

TABLE 4

Cyclic shift values used in shortened PUCCH format 3 in extended CP

| Resource index | Cyclic shift | |
|---|---|---|
| | First slot with $N_{SF,0}^{PUCCH}=5$ | Second slot with $N_{SF,1}^{PUCCH}=4$ |
| 0 | 0 | 0 |
| 1 | 3 | 6 |
| 2 | 5 | 3 |
| 3 | 8 | 9 |
| 4 | 10 | 0 |

Note that in a slot with $N_{SF}^{PUCCH}=5$, the cyclic shift separation between adjacent resources is 2 or 3. In a slot with $N_{SF}^{PUCCH}=4$, the minimum cyclic shift separation is 3.

In the shortened PUCCH format, either resource index 0 or 4 can be used but not both. By allowing either resource index to be used, the scheduler flexibility to allocate shortened PUCCH format 3 dynamically can be increased or even maximized.

In certain designs, the same cyclic shift hopping scheme for the DM-RS as for PUCCH format 2/2a/2b may be followed. Such a cyclic shift hopping scheme may mitigate the impact of inter-cell interference (as distinguished from inter-UE interference in the same cell) on PUCCH format 3 channel estimation.

The proposed cyclic shift can be implemented as shown below.

For PUCCH formats 2, 2a and 2b, $\alpha_p(n_s,l)$ is defined by 3GPP TS 36.211 Section 5.4.2.

For PUCCH format 3, $\alpha_p(n_s,l)$ is given by $$\alpha_p(n_s, l) = 2\pi \cdot n_{cs}^{(p)}(n_s, l)/N_{sc}^{RB}$$

where $$n_{cs}^{(p)}(n_s, l) = (n_{cs}^{cell}(n_s, l) + n_p'(n_s, l)) \bmod N_{sc}^{RB}$$

$$n_p'(n_s, l) = s(n_p''(n_s, l))$$

and $$n_p''(n_s, l) = \begin{cases} n_{PUCCH}^{(3,p)} \bmod N_{SF,0}^{PUCCH}, & l = 1 \\ (3 \cdot (n_{PUCCH}^{(3,p)} \bmod N_{SF,0}^{PUCCH})) \bmod N_{SF}^{PUCCH}, & l = 5 \end{cases}$$

for normal CP and $$n_p''(n_s, l) =$$

$$\begin{cases} n_{PUCCH}^{(3,p)} \bmod N_{SF,0}^{PUCCH}, & l = 3, n_s \bmod 2 = 0 \\ (3 \cdot (n_{PUCCH}^{(3,p)} \bmod N_{SF,0}^{PUCCH})) \bmod N_{SF}^{PUCCH}, & l = 3, n_s \bmod 2 = 1 \end{cases}$$

for extended CP.

TABLE 5.5.2.2.1-0

Mapping cyclic shift index $n_p''(n_s)$ to cyclic shift value $s(n_p''(n_s))$

| $n_p''(n_s)$ | $s(n_p''(n_s))$ | |
|---|---|---|
| | $N_{SF}^{PUCCH}=5$ | $N_{SF}^{PUCCH}=4$ |
| 0 | 0 | 0 |
| 1 | 3 | 3 |
| 2 | 5 | 6 |

TABLE 5.5.2.2.1-0-continued

Mapping cyclic shift index $n_p''(n_s)$ to cyclic shift value $s(n_p''(n_s))$

| | $s(n_p''(n_s))$ | |
|---|---|---|
| $n_p''(n_s)$ | $N_{SF}^{PUCCH}=5$ | $N_{SF}^{PUCCH}=4$ |
| 3 | 8 | 9 |
| 4 | 10 | N/A |

The number of reference symbols for each slot $N_{RS}^{PUCCH}$ and the sequence $\bar{w}^{(p)}(n)$ are given by Table 5.5.2.2.1-1 and 5.5.2.2.1-3, respectively.

OCC can be defined for the PUCCH format 3 DM-RS in the normal cyclic prefix case. According to an aspect of the present disclosure, the implementation is as follows:

For PUCCH format 3, $\alpha_p(n_s,l)$ is given by $$\alpha_p(n_s,l)=2\pi \cdot n_{cs}^{(p)}(n_s,l)/N_{sc}^{RB}$$

where $$n_{cs}^{(p)}(n_s,l)=(n_{cs}^{cell}(n_s,l)+n_p'(n_s))\bmod N_{sc}^{RB}$$

$$n_p'(n_s)=s(n_p''(n_s))$$

and $$n_p''(n_s)=n_{PUCCH}^{(3,p)} \bmod N_{SF,0}^{PUCCH}$$

for $n_s \bmod 2=0$ and $$n_p''(n_s) = \begin{cases} (2 \cdot n_p''(n_s-1)) \bmod N_{SF,1}^{PUCCH} & \text{if } N_{SF,1}^{PUCCH} = 5 \\ n_p''(n_s-1) \bmod N_{SF,1}^{PUCCH} & \text{otherwise} \end{cases}$$

for $n_s \bmod 2=1$.

For PUCCH format 3, $\bar{n}_{oc}^{(p)}(n_s)$ is given by $$\bar{n}_{oc}^{(p)}(n_s) = \begin{cases} n_p''(n_s) \bmod N_{RS}^{PUCCH} & \text{if } N_{SF}^{PUCCH} = 5 \\ \lfloor n_p''(n_s)/2 \rfloor \bmod N_{RS}^{PUCCH} & \text{otherwise} \end{cases}$$

The number of reference symbols for each slot $N_{RS}^{PUCCH}$ and the sequence $\bar{w}^{(p)}(n)$ are given by Table 5.5.2.2.1-1 and 5.5.2.2.1-3, respectively.

TABLE 5.5.2.2.1-1

Number of PUCCH demodulation reference symbols per slot $N_{RS}^{PUCCH}$.

| PUCCH format | Normal cyclic prefix | Extended cyclic prefix |
|---|---|---|
| 1, 1a, 1b | 3 | 2 |
| 2, 3 | 2 | 1 |
| 2a, 2b | 2 | N/A |

TABLE 5.5.2.2.1-2

Orthogonal sequences $[\bar{w}^{(p)}(0) \ldots \bar{w}^{(p)}(N_{RS}^{PUCCH}-1)]$ for PUCCH formats 1, 1a and 1b.

| Sequence index $\bar{n}_{oc}^{(p)}(n_s)$ | Normal cyclic prefix | Extended cyclic prefix |
|---|---|---|
| 0 | [1 1 1] | [1 1] |
| 1 | [1 $e^{j2\pi/3}$ $e^{j4\pi/3}$] | [1 −1] |
| 2 | [1 $e^{j4\pi/3}$ $e^{j2\pi/3}$] | N/A |

TABLE 5.5.2.2.1-3

Orthogonal sequences $[\bar{w}^{(p)}(0) \ldots \bar{w}^{(p)}(N_{RS}^{PUCCH}-1)]$ for PUCCH formats 2, 2a, 2b.

| Normal cyclic prefix | Extended cyclic prefix |
|---|---|
| [1 1] | [1] |

TABLE 5.5.2.2.1-4

Orthogonal sequences $[\bar{w}^{(p)}(0) \ldots \bar{w}^{(p)}(N_{RS}^{PUCCH}-1)]$ for PUCCH format 3.

| Sequence index $\bar{n}_{oc}^{(p)}(n_s)$ | Normal cyclic prefix | Extended cyclic prefix |
|---|---|---|
| 0 | [1 1] | [1] |
| 1 | [1 −1] | N/A |

Furthermore, the mapping of PUCCH format 3 resource indexes to OCC indexes has not been defined. In certain designs, the resource index is mapped according to the available resources in the first slot. However, a drawback of this solution is that the base station may need to keep track of the available resources in the shortened PUCCH format 3 subframes and manage the resources to avoid collision.

In certain designs, OCC may be mapped for data. In PUCCH format 3, the same data is transmitted on all symbols. The OCC can be used to multiplex the UEs. In one aspect of the present disclosure, an OCC may be remapped between the two slots of a given subframe, enhancing performance in high Doppler scenarios. When the OCC are DFT basis functions then the adjacent OCC functions are the most susceptible to cross-user interference. Therefore, the remapping should move adjacent OCC functions to non-adjacent OCC functions. This can be achieved with a decimation of two of the resource indices. That is, the OCC index hops from one slot to the other slot of the subframe. If the second slot has only four symbols, the OCC index is defined in Table 5.4.2A-1. If the second slot has five symbols, the hopping is derived based on equations 1 and 2 below.

More specifically, the OCC index is based on a UE specific signaling parameter (e.g., the PUCCH resource index) and the spreading factor of the slots of the subframe. In format 3, each slot has at most five symbols because two symbols are occupied by the DM-RS. The second slot can also include the SRS in the last symbol. In this case, the second slot has only four symbols.

The proposed data OCC mapping can be implemented as shown below.

The block of bits $b(0), \ldots, b(M_{bit}-1)$ is scrambled with a UE-specific scrambling sequence, resulting in a block of scrambled bits $\tilde{b}(0), \ldots, \tilde{b}(M_{bit}-1)$ according to $\tilde{b}(i)=(b(i)+c(i))\bmod 2$ where the scrambling sequence $c(i)$ is given by Section 7.2. The scrambling sequence generator shall be initialized with $c_{init}=(\lfloor n_s/2 \rfloor+1)\cdot(2N_{ID}^{cell}+1)\cdot 2^{16}+n_{RNTI}$ at the start of each subframe where $n_{RNTI}$ is the C-RNTI.

The block of scrambled bits $\tilde{b}(0), \ldots, \tilde{b}(M_{bit}-1)$ can be QPSK modulated as described in 3GPP TS 36.211 Section 7.1, resulting in a block of complex-valued modulation symbols $d(0), \ldots, d(M_{symb}-1)$ where $M_{symb}=M_{bit}/2=2N_{sc}^{RB}$.

The complex-valued symbols $d(0), \ldots, d(M_{symb}-1)$ is block-wise spread with the orthogonal sequence $w_{n_{oc}}(i)$ resulting in $N_{SF,0}^{PUCCH}+N_{SF,1}^{PUCCH}$ sets of $N_{sc}^{RB}$ values each according to $$y_n(i) = \begin{cases} w_{n_{oc},0}(\bar{n}) \cdot d(i) & n < N_{SF,0}^{PUCCH} \\ w_{n_{oc},1}(\bar{n}) \cdot d(N_{sc}^{RB} + i) & \text{otherwise} \end{cases}$$

$$\bar{n} = n \bmod N_{SF,0}^{PUCCH}$$

$$n = 0, \ldots, N_{SF,0}^{PUCCH} + N_{SF,1}^{PUCCH} - 1$$

$$i = 0, 1, \ldots, N_{sc}^{RB} - 1$$

where $N_{SF,0}^{PUCCH} = N_{SF,1}^{PUCCH} = 5$ for both slots in a subframe using normal PUCCH format 3 and $N_{SF,0}^{PUCCH} = 5$, $N_{SF,1}^{PUCCH} = 4$ holds for the first and second slot, respectively, in a subframe using shortened PUCCH format 3. The orthogonal sequences $w_{n_{oc},0}(i)$ and $w_{n_{oc},1}(i)$ are given by Table 5.4.2A-1. Resources for transmission of PUCCH formats 3 are identified by a resource index $n_{PUCCH}^{(3,p)}$ from which the quantities $n_{oc,0}$ and $n_{oc,1}$ are derived as equation 1:

$$n_{oc,0} = n_{PUCCH}^{(3,p)} \bmod N_{SF,0}^{PUCCH}$$

and equation 2:

$$n_{oc,1} = \begin{cases} (3 \cdot (n_{PUCCH}^{(3,p)} \bmod N_{SF,0}^{PUCCH})) \bmod N_{SF,1}^{PUCCH} & \text{if } N_{SF,1}^{PUCCH} = 5 \\ (n_{PUCCH}^{(3,p)} \bmod N_{SF,0}^{PUCCH}) \bmod N_{SF,1}^{PUCCH} & \text{otherwise} \end{cases}$$

TABLE 5.4.2A-1

The orthogonal sequence $w_{n_{oc}}(i)$.

| Sequence index $n_{oc}$ | Orthogonal sequence $[w_{n_{oc}}(0) \ldots w_{n_{oc}}(N_{SF}^{PUCCH} - 1)]$ | |
|---|---|---|
| | $N_{SF}^{PUCCH} = 5$ | $N_{SF}^{PUCCH} = 4$ |
| 0 | $[1\ 1\ 1\ 1\ 1]$ | $[+1\ +1\ +1\ +1]$ |
| 1 | $[1\ e^{j2\pi/5}\ e^{j4\pi/5}\ e^{j6\pi/5}\ e^{j8\pi/5}]$ | $[+1\ -1\ +1\ -1]$ |
| 2 | $[1\ e^{j4\pi/5}\ e^{j8\pi/5}\ e^{j2\pi/5}\ e^{j6\pi/5}]$ | $[+1\ +1\ -1\ -1]$ |
| 3 | $[1\ e^{j6\pi/5}\ e^{j2\pi/5}\ e^{j8\pi/5}\ e^{j4\pi/5}]$ | $[+1\ -1\ -1\ +1]$ |
| 4 | $[1\ e^{j8\pi/5}\ e^{j6\pi/5}\ e^{j4\pi/5}\ e^{j2\pi/5}]$ | — |

That is, a UE specific signaling parameter (e.g., a resource index $n_{PUCCH}^{(3,p)}$) may be used to derive the OCC index for both slots of a subframe. Moreover, for the second slot, the OCC index also depends on whether four or five symbols are available (i.e., whether SRS is transmitted in the last symbol).

According to another aspect of the present disclosure, the mapping of PUCCH format 3 resources to physical resource blocks (PRBs) is defined. Two configurations are proposed for the mapping to PRBs. In other designs, a mechanism similar to Rel-8 is extended for PUCCH format 3. In some designs, variable mapping is performed, as explained in greater detail below.

In some designs, a mapping similar to that described in 3GPP TS 36.3211 may be used. The proposed application of mapping to physical resources can be implemented using the following changes to the current version of LTE-A.

The block of complex-valued symbols $z^{(p)}(i)$ is multiplied with the amplitude scaling factor $\beta_{PUCCH}$ in order to conform to the specified transmit power $P_{PUCCH}$, and mapped in sequence starting with $z^{(p)}(0)$ to resource elements. PUCCH uses one resource block in each of the two slots in a subframe. Within the physical resource block used for transmission, the mapping of $z^{(p)}(i)$ to resource elements (k,l) on antenna port p and not used for transmission of reference signals is in increasing order of first k, then l and finally the slot number, starting with the first slot in the subframe.

The physical resource blocks to be used for transmission of PUCCH in slot $n_s$ are given by $$n_{PRB} = \begin{cases} \left\lfloor \frac{m}{2} \right\rfloor & \text{if } (m + n_s \bmod 2) \bmod 2 = 0 \\ N_{RB}^{UL} - 1 - \left\lfloor \frac{m}{2} \right\rfloor & \text{if } (m + n_s \bmod 2) \bmod 2 = 1 \end{cases}$$

where the variable m depends on the PUCCH format. For formats 1, 1a and 1b $$m = \begin{cases} N_{RB}^{(2)} & \text{if } n_{PUCCH}^{(1,p)} < c \cdot N_{cs}^{(1)}/\Delta_{shift}^{PUCCH} \\ \left\lfloor \frac{n_{PUCCH}^{(1,p)} - c \cdot N_{cs}^{(1)}/\Delta_{shift}^{PUCCH}}{c \cdot N_{sc}^{RB}/\Delta_{shift}^{PUCCH}} \right\rfloor + N_{RB}^{(2)} & \text{otherwise} \\ N_{RB}^{(2)} + \left\lceil \frac{N_{cs}^{(1)}}{8} \right\rceil \end{cases}$$

$$c = \begin{cases} 3 & \text{normal cyclic prefix} \\ 2 & \text{extended cyclic prefix} \end{cases}$$

for formats 2, 2a and 2b $$m = \lfloor n_{PUCCH}^{(2,p)}/N_{sc}^{RB} \rfloor$$

and for format 3

$$m = \lfloor n_{PUCCH}^{(3,p)}/N_{SF,0}^{PUCCH} \rfloor$$

It may be appreciated that the index m is calculated using an upper-layer configured parameter for formats 2/2a/2b and using a spreading factor dependent denominator for format 3. Therefore, while 12 different values may be possible for formats 2/2a/2b, four or five different values are possible for format 3.

In addition, considering DFT-S-OFDM is not compatible with Rel-8 PUCCH format 1/1a/1b and PUCCH format 2/2a/2b, the physical resource blocks used for DFT-S-OFDM should be configured by higher layers. Similar to resource configuration for PUCCH in Rel-8, the parameter: $N_{RB}^{(2)}$ can be reused to signal the total amount of resource blocks taken by PUCCH format 2/2a/2b and DFT-S-OFDM. Note that in order to support mixed resource blocks where PUCCH format 1/1a/1b and PUCCH format 2/2a/2b are co-existing, the last PRB in the set of $N_{RB}^{(2)}$ RBs for PUCCH format 2/2a/2b and DFT-S-OFDM should not be used for DFT-S-OFDM (see FIG. 5).

Figure 5:
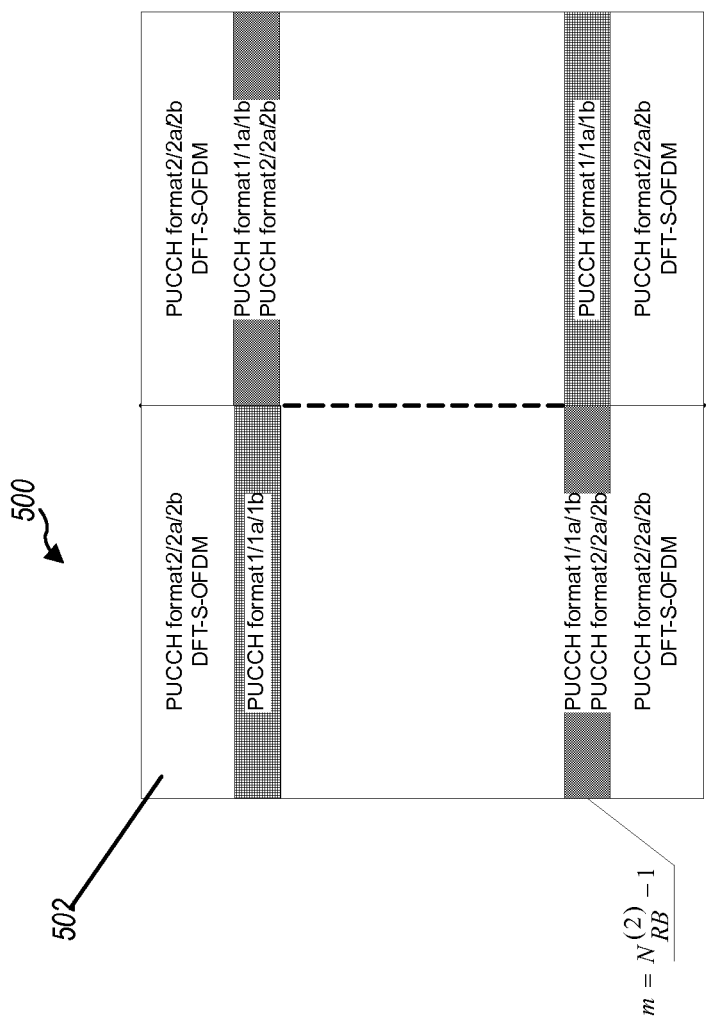
FIG. 5 is an example physical resource block allocation for PUCCH according to an aspect of the present disclosure.

FIG. 5 depicts an example PRB allocation scheme 500. Each block, such as block 502, represents a PRB allocated to a corresponding PUCCH transmission. Note that the allocation in FIG. 5 is just an example, and that other allocations are possible. It will be appreciated that the PRB allocation 500 maintains that the UE 120 uses $N_{RB}^{(2)}$ parameter similar to Rel-8 for dynamic ACK resource determination.

As mentioned above, the previously discussed mapping scheme may keep the format 3 resource to PRB mapping constant, both from the UE perspective and from the overall cell-specific format 3 utilization perspective. In some designs, the eNB may implement a collision avoidance scheme in shortened PUCCH format 3 subframes.

An alternative solution is to make the format 3 resource to PRB mapping variable. In this case, the eNB 110 may not implement a complicated collision resolution algorithm;

however, the eNodeB implements a scheme to utilize the 'recycled' PRBs, if and when they occur in normal PUCCH format 3 subframes.

In another aspect, the alternative solution may introduce a new layer 3 configured parameter to indicate the format 3 start PRB. The alternative mapping can be implemented as shown below for format 3.

$$m = \lfloor n_{PUCCH}^{(3,p)} / N_{SF,1}^{PUCCH} \rfloor + N_{RB}^{(3,p)}$$

where $N_{RB}^{(3,p)}$ is the frequency offset used for mapping the first PUCCH format 3 resource, expressed in multiples of $N_{sc}^{RB}$.

For PUCCH format 3, $\alpha_p(n_s, l)$ is given by $$\alpha_p(n_s, l) = 2\pi \cdot n_{cs}^{(p)}(n_s, l) / N_{sc}^{RB}$$

where $$n'_p(n_s) = s(n''_p(n_s))$$

and $$n''_p(n_s) = n_{PUCCH}^{(3,p)} \bmod N_{SF,0}^{PUCCH}$$

for $n_s \bmod 2 = 0$ and $$n''_p(n_s) = \begin{cases} (2 \cdot n''_p(n_s - 1)) \bmod N_{SF,1}^{PUCCH} & \text{if } N_{SF,1}^{PUCCH} = 5 \\ n_{PUCCH}^{(3,p)} \bmod N_{SF,1}^{PUCCH} & \text{otherwise} \end{cases}$$

for $n_s \bmod 2 = 1$.

The number of reference symbols per slot $N_{RS}^{PUCCH}$ and the sequence $\bar{w}^{(p)}_{(n)}$ are given by Table 5.5.2.2.1-1 and 5.5.2.2.1-3, respectively.

According to another aspect of the present disclosure, data encoding is considered. Currently, (32, O) Reed-Muller (RM) code from Rel-8 is reused for PUCCH format 3 when the payload is less than or equal to 11 bits. For payloads greater than 11 bits, tail biting convolutional coding (TBCC) can be used for data encoding, as in Rel-8. In another configuration, the payload can be divided into two halves and each half encoded with the Rel-8 (32, O) RM code. The 32 coded bits for each half payload are truncated into 24 bits, and then the two sets of 24 coded bits are interleaved over two slots.

Figure 6:
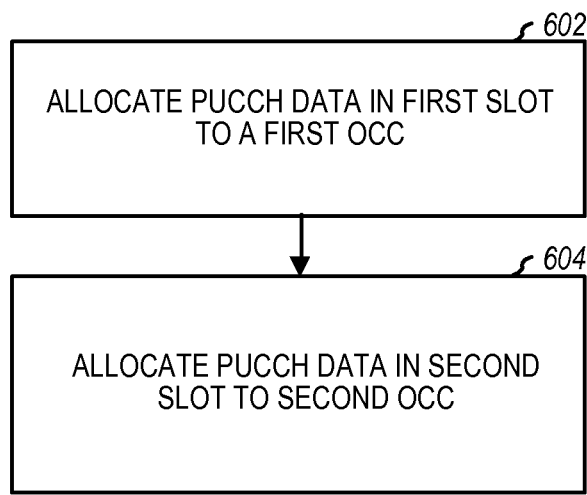
FIG. 6 is a flow chart illustrating a process of wireless communication according to an aspect of the present disclosure.

As discussed above, additional details of PUCCH format 3 definitions have been disclosed. In a design, cyclic shift hopping for DM-RS may be implemented by applying the same cyclic shift hopping as for Format 2/2a/2b. In another design, cyclic shift allocation for DM-RS may be implemented to maximize the distance between closest cyclic shifts and/or reverse relative position of adjacent cyclic shifts. In yet another design, mapping of resource index to data OCC index may be implemented. In still another design, data OCC index mapping may be implemented by applying OCC remapping across slots to improve interference suppression in large power imbalance. Moreover, resource assignment to PRBs has been discussed FIG. 6 is a flow chart of a process of wireless communication. The method includes, at block 602, allocating PUCCH data in a first slot to a first OCC. At block 604, PUCCH data in a second slot of the same subframe is allocated to a different OCC. The PUCCH data may be in accordance with PUCCH format 3. In an aspect, the first OCC and the second OCC may be based on a UE specific signaling parameter such as a resource index that identifies resources used for transmitting the PUCCH data. In another aspect, the second OCC may be further based on a number of symbols available for data in the second slot. In one aspect, OCCs are selected across slots to facilitate interference suppression. The interference suppression may be useful when received power for one UE is dominant over received power for another UE. The interference suppression may be useful when there is high Doppler fading of one or both UEs, resulting in greater interference between transmitted data signals.

Figure 7:
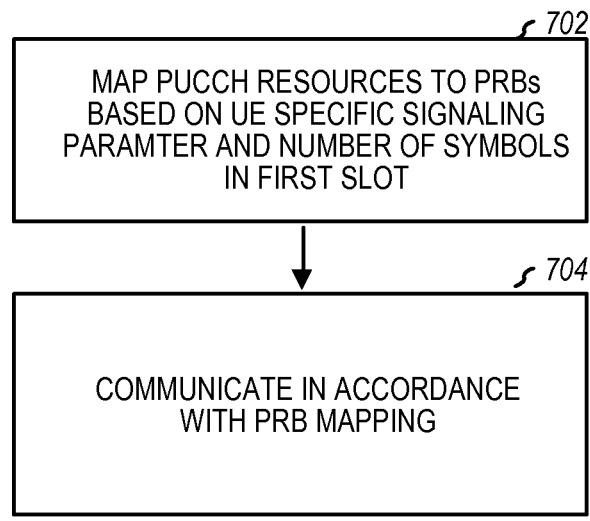
FIG. 7 is a flow chart illustrating a process of wireless communication according to another aspect of the present disclosure.

FIG. 7 is a flow chart of another process for wireless communication. At block 702, PUCCH resources are mapped to physical resource blocks. The mapping is based on a UE specific signaling parameter, and a number of symbols in a slot of a subframe. At block 704, communication occurs in accordance with the PRB mapping. In an aspect, the mapping is further based on a frequency offset used for mapping a first PUCCH format 3 resource. The frequency offset may be expressed in multiples of $N_{sc}^{RB}$ (which is a resource block size in the frequency domain, expressed as a number of subcarriers).

Figure 8:
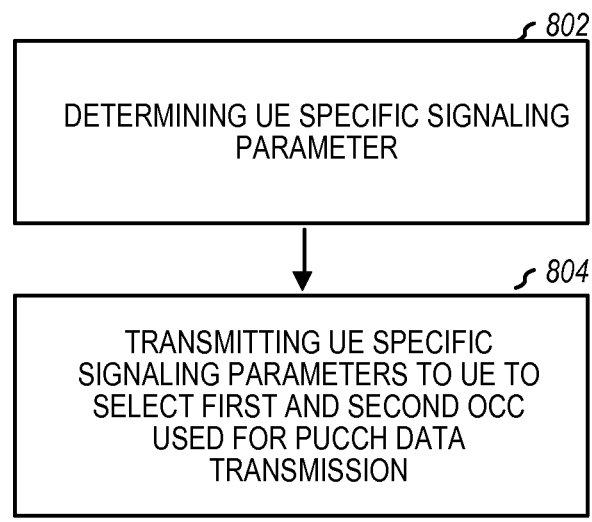
FIG. 8 is a flow chart illustrating a process of wireless communication according to another aspect of the present disclosure.

FIG. 8 is a flow chart of another process for wireless communication. At block 802, the eNodeB (such as eNodeB 110) determines UE specific signaling parameters. At block 804, the eNodeB 110 transmits UE specific signaling parameters to the UE 120 to select first and second OCCs used for PUCCH data transmission.

In one configuration, the UE 120 is configured for wireless communication including means for transmitting. In one aspect, the transmitting means may be the memory 482, controller/processor 480, transmit processor 464, transmit MIMO processor 466, modulators 454a-454r and/or antenna 452a-452r configured to perform the functions recited by the transmitting means. The UE 120 is also configured to include means for determining. In one aspect, the determining means may be the memory 482 and/or controller/processor 480 configured to perform the functions recited by the determining means. In another aspect, the aforementioned means may be a module or any apparatus configured to perform the functions recited by the aforementioned means.

In one configuration, the eNodeB 110 is configured for wireless communication including means for receiving. In one aspect, the receiving means may be the receive processor 438, transmit MIMO detector 436, demodulators 432a-t, controller/processor 430 and/or antenna 434a-t configured to perform the functions recited by the receiving means. The eNodeB 110 is also configured to include a means for despreading. In one aspect, the dispreading means may be the controller/processor 440 and memory 442 configured to perform the functions recited by the dispreading means. The eNodeB 110 is also configured to include a means for determining. In one aspect, the determining means may be the controller/processor 440 and/or memory 442 configured to perform the functions recited by the determining means. In another aspect, the aforementioned means may be a module or any apparatus configured to perform the functions recited by the aforementioned means.

It will be appreciated that techniques for cyclically shifting allocation of DM-RS between two transmission symbols or slots are disclosed. In one aspect, the distance (i.e., slot index) between cyclically shifted transmission resources are increased or maximized. Furthermore, in certain designs, the same hopping as for PUCCH formats 2/2a/2b may be employed.

It will be further appreciated that techniques are disclosed for applying orthogonal cover codes (OCC) for reference signals transmitted as DM-RS. In one aspect, orthogonally coding DM-RS transmissions may be advantageous to suppress inter-UE interference, especially when there is a large power imbalance between interfering UEs (i.e., one UE's received power dominates over another UE's received power).

It will further be appreciated that the disclosed techniques maintain a resource index to physical resource block (PRB) mapping across normal and shortened PUCCH format 3 frames. In one aspect, OCCs are remapped across slots to facilitate interference suppression. The interference suppression may be useful when received power for one UE is dominant over received power for another UE. The interference suppression may be useful when there is high Doppler fading of one or both UEs, resulting in greater interference between transmitted DM-RS signals.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communication, comprising:
    transmitting physical uplink control channel (PUCCH) data in a first slot of a subframe with a first orthogonal cover code (OCC); and
    transmitting the PUCCH data in a second slot of the subframe with a second OCC that differs from the first OCC, the first OCC and the second OCC being determined based on a spreading factor, and the second OCC being further determined based on a multiple of the first OCC when a number of symbols available in the second slot is equal to a predetermined number.

2. The method of claim 1, in which the PUCCH data is in accordance with a discrete Fourier transform (DFT)-spread single carrier-frequency division multiplexing (SC-FDM) format.

3. The method of claim 2, in which the PUCCH data is in accordance with format 3.

4. The method of claim 1, in which the first OCC and the second OCC are further based on a user equipment (UE) specific signaling parameter.

5. The method of claim 4, in which the UE specific signaling parameter includes a resource index that identifies resources used for transmitting the PUCCH data.

6. A method of wireless communication, comprising:
    receiving physical uplink control channel (PUCCH) data;
    despreading the PUCCH data in a first slot of a subframe having a first orthogonal cover code (OCC); and
    despreading the PUCCH data in a second slot of the subframe having a second OCC that differs from the first OCC, the first OCC and the second OCC being determined based on a spreading factor, and the second OCC being further determined based on a multiple of the first OCC when a number of symbols available in the second slot is equal to a predetermined number.

7. An apparatus for wireless communication, comprising:
a memory; and
at least one processor coupled to the memory, the at least one processor being configured:
to transmit physical uplink control channel (PUCCH) data in a first slot of a subframe with a first orthogonal cover code (OCC); and
to transmit the PUCCH data in a second slot of the subframe with a second OCC that differs from the first OCC, the first OCC and the second OCC being determined based on a spreading factor, and the second OCC being further determined based on a multiple of the first OCC when a number of symbols available in the second slot is equal to a predetermined number.

8. The apparatus of claim 7, in which the PUCCH data is in accordance with a discrete Fourier transform (DFT)-spread single carrier-frequency division multiplexing (SC-FDM) format.

9. The apparatus of claim 8, in which the PUCCH data is in accordance with format 3.

10. The apparatus of claim 7, in which the first OCC and the second OCC are further based on a user equipment (UE) specific signaling parameter.

11. The apparatus of claim 10, in which the UE specific signaling parameter includes a resource index that identifies resources used for transmitting the PUCCH data.

12. An apparatus for wireless communication, comprising:
a memory; and
at least one processor coupled to the memory, the at least one processor being configured:
to receive physical uplink control channel (PUCCH) data;
to despread the PUCCH data in a first slot of a subframe having a first orthogonal cover code (OCC); and
to despread the PUCCH data in a second slot of the subframe having a second OCC that differs from the first OCC, the first OCC and the second OCC being determined based on a spreading factor, and the second OCC being further determined based on a multiple of the first OCC when a number of symbols available in the second slot is equal to a predetermined number.

13. An apparatus for wireless communication, comprising:
means for transmitting physical uplink control channel (PUCCH) data in a first slot of a subframe with a first orthogonal cover code (OCC); and
means for transmitting the PUCCH data in a second slot of the subframe with a second OCC that differs from the first OCC, the first OCC and the second OCC being determined based on a spreading factor, and the second OCC being further determined based on a multiple of the first OCC when a number of symbols available in the second slot is equal to a predetermined number.

14. An apparatus for wireless communication, comprising:
means for receiving physical uplink control channel (PUCCH) data;
means for despreading the PUCCH data in a first slot of a subframe having a first orthogonal cover code (OCC); and
means for despreading the PUCCH data in a second slot of the subframe having a second OCC that differs from the first OCC, the first OCC and the second OCC being determined based on a spreading factor, and the second OCC being further determined based on a multiple of the first OCC when a number of symbols available in the second slot is equal to a predetermined number.

15. A computer program product for wireless communication in a wireless network, comprising:
a non-transitory computer-readable medium having program code recorded thereon, the program code being executed by at least one processor and comprising:
program code to transmit the PUCCH data in a first slot of a subframe with a first orthogonal cover code (OCC); and
program code to transmit the PUCCH data in a second slot of the subframe with a second OCC that differs from the first OCC, the first OCC and the second OCC being determined based on a spreading factor, and the second OCC being further determined based on a multiple of the first OCC when a number of symbols available in the second slot is equal to a predetermined number.

16. A computer program product for wireless communication in a wireless network, comprising:
a non-transitory computer-readable medium having program code recorded thereon, the program code being executed by at least one processor and comprising:
program code to receive physical uplink control channel (PUCCH) data;
program code to despread the PUCCH data in a first slot of a subframe having a first orthogonal cover code (OCC); and
program code to despread the PUCCH data in a second slot of the subframe having a second OCC that differs from the first OCC, the first OCC and the second OCC being determined based on a spreading factor, and the second OCC being further determined based on a multiple of the first OCC when a number of symbols available in the second slot is equal to a predetermined number.

* * * * *